US012649499B2

(12) United States Patent
Yang et al.

(10) Patent No.:  US 12,649,499 B2
(45) Date of Patent:      Jun. 9, 2026

(54) CABLE DETECTION ROBOT AND WORKING METHOD THEREOF

(71) Applicants: SHANDONG UNIVERSITY, Jinan (CN); SHANDONG TRAFFIC ENGINEERING SUPERVISION CONSULTING CO., LTD., Jinan (CN); SHANDONG EXPRESSWAY BRIDGE ENGINEERING TEST AND INSPECTION CO., LTD., Jinan (CN)

(72) Inventors: Zeying Yang, Jinan (CN); Ke Wu, Jinan (CN); Qingshui Gao, Jinan (CN); Canzhu Zhang, Jinan (CN); Xinxue Gao, Jinan (CN); Li Zhao, Jinan (CN); Kaikai Ma, Jinan (CN); Huawei Wang, Jinan (CN); Yingyong Li, Jinan (CN); Jianbo Qu, Jinan (CN); Chenghe Wang, Jinan (CN); Chuanhao Shan, Jinan (CN); Weisong Qu, Jinan (CN); Qianyi Yang, Jinan (CN); Zhenyu Zhao, Jinan (CN); Rui Sun, Jinan (CN); Chuanlong Bi, Jinan (CN); Rongrong Duan, Jinan (CN); Zhilin Qu, Jinan (CN); Hongyun Wang, Jinan (CN); Xue Zhang, Jinan (CN)

(73) Assignees: SHANDONG UNIVERSITY, Shandong (CN); SHANDONG TRAFFIC ENGINEERING SUPERVISION CONSULTING CO., LTD., Shandong (CN); SHANDONG EXPRESSWAY BRIDGE ENGINEERING TEST AND INSPECTION CO., LTD., Shandong (CN)

( * ) Notice: Subject to any disclaimer, the term of this patent is extended or adjusted under 35 U.S.C. 154(b) by 335 days.

(21) Appl. No.: 18/692,106

(22) PCT Filed: Mar. 16, 2022

(86) PCT No.: PCT/CN2022/081233
§ 371 (c)(1),
(2) Date: Mar. 14, 2024

(87) PCT Pub. No.: WO2023/137852
PCT Pub. Date: Jul. 27, 2023

(65) Prior Publication Data
US 2024/0383505 A1      Nov. 21, 2024

(30) Foreign Application Priority Data
Jan. 21, 2022    (CN) .......................... 202210070935.1

(51) Int. Cl.
*B61B 12/02*          (2006.01)
*B62D 57/024*         (2006.01)

(52) U.S. Cl.
CPC ............ *B61B 12/02* (2013.01); *B62D 57/024* (2013.01)

(58) Field of Classification Search
CPC ..... B62D 57/024; E01D 19/10; E01D 19/106; G01N 17/00; B61B 12/02; B61B 12/12; B61B 12/122
See application file for complete search history.

(56) References Cited

U.S. PATENT DOCUMENTS

2016/0161436 A1*  6/2016  Marashdeh ........ G01R 27/2623
                                                     324/681
2018/0057021 A1*  3/2018  Seavey ................. E01D 19/106
2023/0183929 A1*  6/2023  Ding .................... B62D 57/024
                                                     180/7.4

FOREIGN PATENT DOCUMENTS

CN        105239504 A  *  1/2016
CN        108562531 A      9/2018
(Continued)

OTHER PUBLICATIONS

CN-105239504-A translation (Year: 2016).*
(Continued)

*Primary Examiner* — Christopher B Wehrly
(74) *Attorney, Agent, or Firm* — OLIFF PLC

(57) ABSTRACT

A cable detection robot and a working method thereof, wherein the cable detection robot includes: a first main body, a second main body, and a rotatable mechanism. The first
(Continued)

main body and the second main body each include a support, a driving apparatus, and a holding apparatus; the driving apparatus includes a first wheel and a driving motor, to drive the first wheel to move along a cable through the driving motor; the holding apparatus is symmetrically arranged on two sides of the support, each side includes a first servo motor, connecting to a supporting wheel group; the supporting wheel group is perpendicular to a surface of the cable, the holding apparatus holds or is separated from the cable through rotation of the first servo motor, and relative positions of the first main body and the second main body are adjusted through the rotatable mechanism to implement obstacle surmounting.

10 Claims, 5 Drawing Sheets

(56) References Cited

FOREIGN PATENT DOCUMENTS

| CN | 213013903 U | 4/2021 |
| CN | 113463511 A | 10/2021 |
| EP | 2 677 080 A1 | 12/2013 |

OTHER PUBLICATIONS

Oct. 11, 2022 Search Report issued in International Patent Application No. PCT/CN2022/081233.
Oct. 11, 2022 Written Opinion of the International Searching Authority issued in International Patent Application No. PCT/CN2022/081233.

* cited by examiner 25
10
11
12

CABLE DETECTION ROBOT AND WORKING METHOD THEREOF

TECHNICAL FIELD

The present invention relates to the field of robot technologies, and in particular, to a cable detection robot and a working method thereof.

BACKGROUND

The description in this section merely provides background information related to the present invention, and does not necessarily constitute the prior art.

After a suspension bridge is built, cables are exposed in air for a long time, deterioration phenomena such as curing and aging of different degrees occur on a surface protective layer of the cables, and bundled steel wires inside are also corroded by moisture in the air and other acid substances, even leading to wire breaking, which endangers the security of the bridge. Therefore, it is essential to detect and maintain the cables regularly.

At present, cable detection is mainly performed manually through a hoisting machine dragging a small vehicle on which a steel wire detection device and a worker are carried or through a hydraulic elevating platform carrying a worker and a device, which has a long construction period and high costs and affects traffic. In addition, the worker works in an extreme environment, and casualty accidents may even occur. Therefore, a better method is to detect and maintain the cables regularly by using a robot technology.

However, the suspension bridge has diversified structures and diameters of the cables are different, obstacles such as a cable clamp and a spherical joint generally exist. Existing cable detection robots generally use a fixed and closed wheeled clamping structure with a small diameter-changing range, and the robots are generally suitable for sliding along a cable whose cross section remains unchanged and cannot cross obstacles such as a cable clamp.

SUMMARY

To resolve the foregoing problem, the present invention provides a cable detection robot and a working method thereof. When the robot moves on a surface of a cable, a holding apparatus is adjusted through rotation of a first servo motor, so that the holding apparatus holds or is separated from cables having different diameters; and relative positions of a first main body and a second main body are adjusted through a rotatable mechanism, so that the cable detection robot surmounts obstacles such as a cable clamp and adapts to different cable diameters.

To achieve the foregoing objectives, the present invention adopts the following technical solutions:

According to a first aspect, the present invention provides a cable detection robot, including: a first main body, a second main body, and a rotatable mechanism connecting the first main body and the second main body, where the first main body and the second main body each include a support, and a driving apparatus and a holding apparatus arranged on the support;

the driving apparatus includes a first wheel and a driving motor, to drive the first wheel to move along a cable through the driving motor;

the holding apparatus is symmetrically arranged on two sides of the support, each side includes a first servo motor, a first supporting rod, and a second supporting rod that are connected sequentially, an adjustable bracket is respectively arranged on the first supporting rod and the second supporting rod, and the adjustable bracket is connected to a supporting wheel group; and an angle between the first supporting rod and the second supporting rod matches a diameter of the cable, the supporting wheel group is perpendicular to a surface of the cable by adjusting a height of the adjustable bracket and adjusting relative positions of the supporting wheel group and the surface of the cable, the holding apparatus holds or is separated from the cable through rotation of the first servo motor, and relative positions of the first main body and the second main body are adjusted through the rotatable mechanism to implement obstacle surmounting.

In an optional implementation, a rotation joint configured to adjust the angle is arranged at a junction of the first supporting rod and the second supporting rod.

In an optional implementation, the rotation joint connects the first supporting rod and the second supporting rod in a bolted connection manner, to adjust the rotation angle between the first supporting rod and the second supporting rod.

In an optional implementation, the adjustable bracket includes a first sleeve, a second sleeve, an elastic member, and a telescopic rod, the adjustable bracket is fixed to the first supporting rod and the second supporting rod through the first sleeve, the first sleeve is connected to the second sleeve, the telescopic rod is arranged in the second sleeve, and the telescopic rod is connected to the supporting wheel group through the elastic member.

In an optional implementation, the telescopic rod is provided with an inner cavity, the elastic member is arranged in the inner cavity, one end of the elastic member is fixed to the telescopic rod, and an other end is fixed to the supporting wheel group.

In an optional implementation, a first sleeve thread is provided on an inner wall of the first sleeve, a bolt is connected to the first sleeve thread, and the adjustable bracket is fixed to the first supporting rod by squeezing the first supporting rod after the bolt is tightened.

In an optional implementation, a second sleeve thread is provided on an inner wall of the second sleeve, a bolt is connected to the second sleeve thread, and the telescopic rod is fixed to the adjustable bracket by squeezing the telescopic rod after the bolt is tightened.

In an optional implementation, the supporting wheel group includes a chassis, and joints and second wheels arranged on the chassis; and the chassis is connected to the adjustable bracket, and the second wheels are connected at two ends of the chassis through the joints.

In an optional implementation, the joint is configured to adjust an angle between the second wheel and the surface of the cable.

In an optional implementation, the chassis uses an I-shaped structure, a middle portion of the chassis is a protruding column, and the column is connected to a telescopic rod through an elastic member.

In an optional implementation, the rotatable mechanism includes a supporting bracket and a second servo motor; and the second servo motor is arranged on both the first main body and the second main body, and two ends of the supporting bracket are respectively connected to shafts of the second servo motors of the first main body and the second main body, to adjust the relative positions of the first main body and the second main body through the second servo motor.

In an optional implementation, a controller is further arranged on the second main body, and the controller is connected to the driving motor, the first servo motor, and the second servo motor.

In an optional implementation, the cable detection robot further includes a multifunctional detection frame, and the multifunctional detection frame is arranged at an end of the first main body that is away from the second main body and an end of the second main body that is away from the first main body.

In an optional implementation, the cable detection robot further includes an obstacle surmounting assisting camera apparatus, the obstacle surmounting assisting camera apparatus is respectively arranged on the first main body and the second main body, and the obstacle surmounting assisting camera apparatuses are mounted opposite to each other, to observe the relative positions of the first main body and the second main body and an obstacle surmounting situation.

According to a second aspect, the present invention provides a working method of the cable detection robot described in the first aspect, including:

adjusting the angle between the first supporting rod and the second supporting rod according to a diameter of a cable, placing the cable detection robot on the cable by adjusting the height of the adjustable bracket, and causing the second wheels of the supporting wheel group to be perpendicular to the surface of the cable by adjusting relative positions of the supporting wheel group and the surface of the cable;

during obstacle surmounting, releasing the holding apparatus of the first main body, namely, separating the holding apparatus from the cable through rotation of the first servo motor, where in this case, the second servo motor of the first main body rotates to drive the first main body to be separated from the cable, and the second main body is used as a fulcrum to drive the second main body to move forward along a radial direction of the cable through the driving apparatus of the second main body;

after the first main body surmounts an obstacle, rotating by the second servo motor of the first main body to drive the first main body to be placed on the surface of the cable, controlling the holding apparatus of the first main body to hold the cable, and controlling the holding apparatus of the second main body to release the cable, where in this case, the second servo motor of the second main body rotates to drive the second main body to be separated from the cable, and the first main body is used as a fulcrum to drive the first main body to move forward along the radial direction of the cable through the driving apparatus of the first main body; and after the second main body surmounts the obstacle, rotating by the second servo motor of the second main body to drive the second main body to be placed on the surface of the cable, and controlling the holding apparatus of the second main body to hold the cable, to implement obstacle surmounting.

Compared with the related art, the present invention has the following beneficial effects:

The present invention provides a cable detection robot and a working method thereof. After the robot approaches an obstacle, the holding apparatus of the first main body is released, and the first main body is separated from the cable through the rotatable mechanism. In this case, the robot moves forward along the radial direction of the cable by using the second main body as a fulcrum. After the first main body surmounts the obstacle, the holding apparatus of the first main body holds the cable, the holding apparatus of the second main body is released, and the second main body is separated from the cable through the rotatable mechanism. In this case, the robot moves forward along the radial direction of the cable by using the first main body as a fulcrum. After the second main body surmounts the obstacle, the holding apparatus of the second main body is controlled to hold the cable, thereby implementing obstacle surmounting, and ensuring the walking and obstacle surmounting stability of the cable detection robot.

In the cable detection robot and the working method thereof provided in the present invention, the angle between the first supporting rod and the second supporting rod is adjusted in advance according to the diameter of the cable, the cable detection robot is placed on the cable by adjusting the height of the adjustable bracket, and the second wheels of the supporting wheel group are perpendicular to the surface of the cable by adjusting the relative positions of the supporting wheel group and the surface of the cable; and during obstacle surmounting, the entire holding apparatus holds or is separated from cables having different diameters through rotation of the first servo motor.

In the cable detection robot and the working method thereof provided in the present invention, a step of mounting obstacle surmounting assisting camera apparatuses that are opposite to each other on the first main body and the second main body is further included, to observe the relative positions of the two main bodies and an obstacle surmounting situation in time.

Advantages of additional aspects of the present invention will be provided in the following descriptions, some of which will become apparent from the following descriptions or may be learned from practices of the present invention.

BRIEF DESCRIPTION OF THE DRAWINGS

In this specification, the accompanying drawings constituting a part of the present invention are used to provide a further understanding of the present invention. The exemplary embodiments of the present invention and descriptions thereof are used to explain the present invention, and do not constitute an improper limitation to the present invention.

In the accompanying drawings: 1. First main body; 2. Second main body; 3. Rotatable mechanism; 4. Multifunctional detection frame; 5. First servo motor; 6. Second servo motor; 7. First supporting rod; 8. Second supporting rod; 9. Obstacle surmounting assisting camera apparatus; 10. Second wheel; 11. Joint; 12. Chassis; 13. Adjustable bracket; 14. Rotation joint; 15. Cable; 16. First wheel; 17. Controller; 18. Camera apparatus; 19. Driving apparatus; 20. Bolt; 21. First sleeve; 22. Second sleeve; 23. Elastic member; 24. Column;

25. Telescopic rod; 26. Supporting bracket; 27. Holding apparatus; 28. Supporting wheel group; 29. Support; 30. Driving motor.

DETAILED DESCRIPTION

The following further describes the present invention with reference to the accompanying drawings and embodiments.

It should be noted that, the following detailed descriptions are merely exemplary and are intended to provide a further understanding of the present invention. Unless otherwise specified, all technical and scientific terms used in this specification have the same meaning as commonly understood by a person of ordinary skill in the art to which the present invention belongs.

It should be noted that the terms used herein are only for describing specific implementations and are not intended to limit exemplary implementations according to the present invention. As used herein, the singular form is intended to include the plural form, unless the context clearly indicates otherwise. Moreover, it should be further understood that, the terms "include", "comprise" and any other variants thereof are intended to cover non-exclusive inclusion. For example, a process, a method, a system, a product, or a device that includes a series of steps or units is not necessarily limited to the expressly listed steps or units, but may include other steps or units that are not expressly listed or other steps or units inherent to the process, the method, the product, or the device.

The embodiments in the present invention and features in the embodiments may be combined with each other without conflict.

Embodiment One

Figure 1:
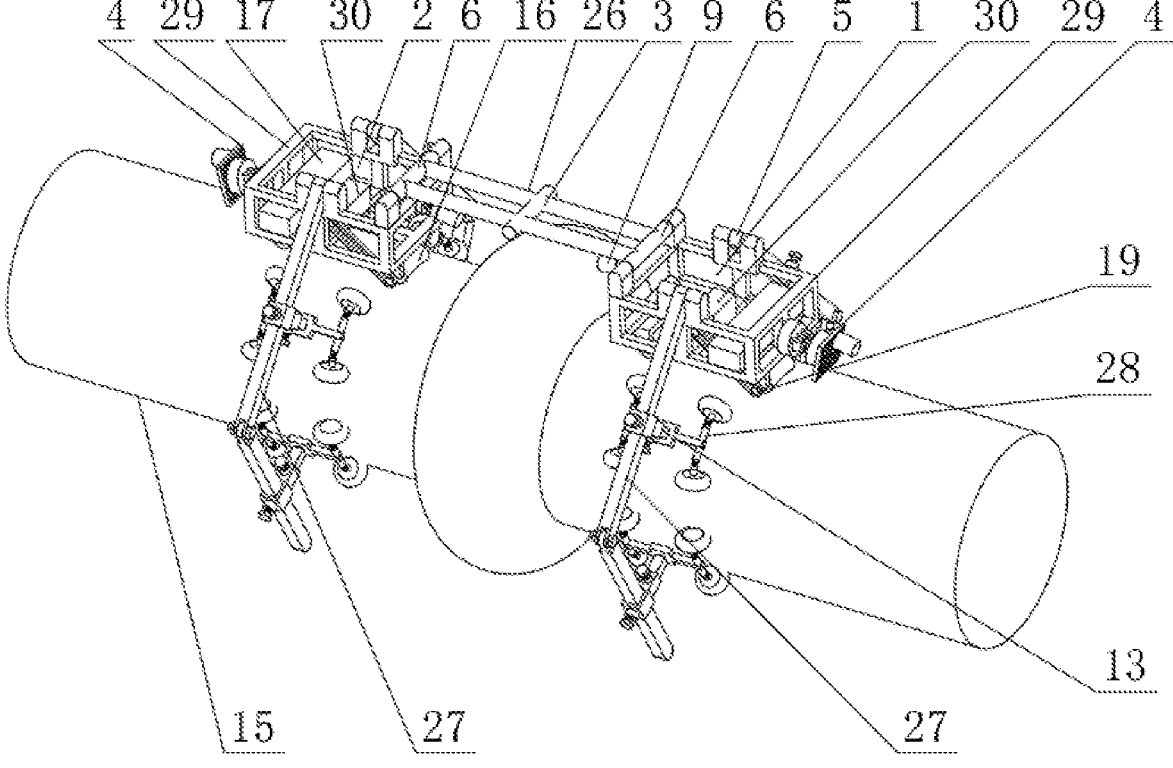
FIG. 1 is an entire structural diagram of a cable detection robot according to Embodiment one of the present invention.
Figure 2:
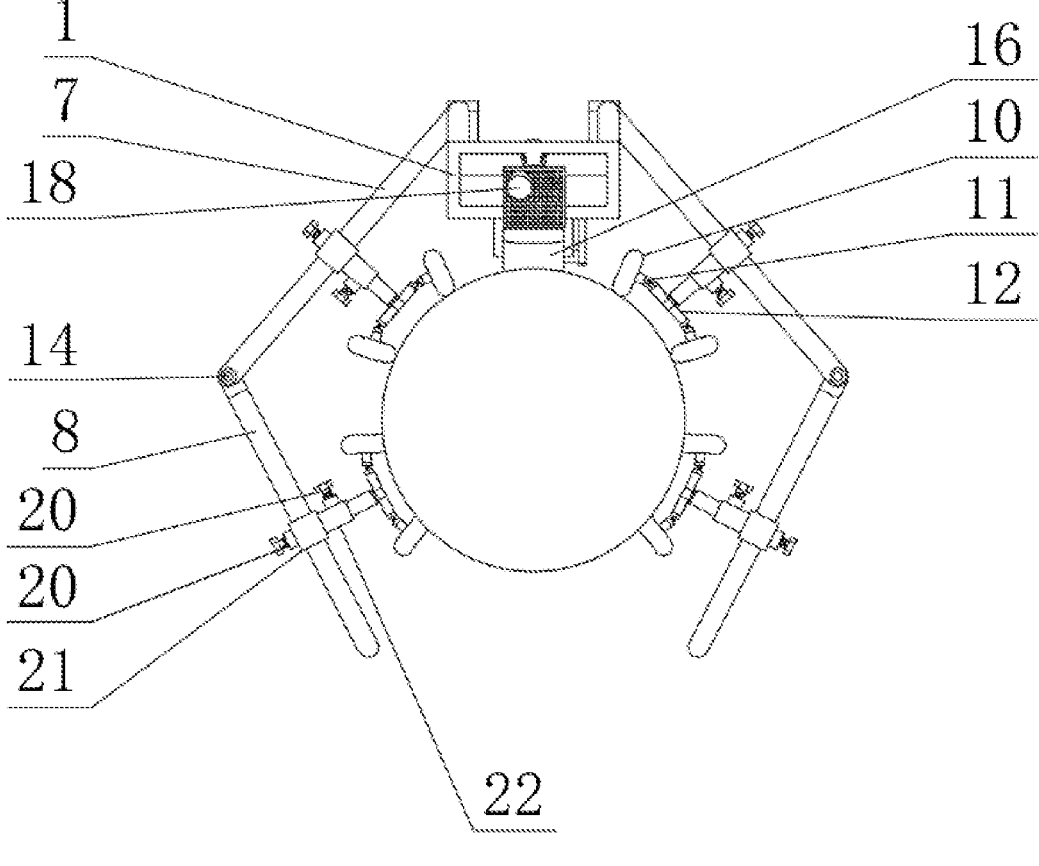
FIG. 2 is a front view of a cable detection robot according to Embodiment one of the present invention.

As shown in FIG. 1 and FIG. 2, this embodiment provides a cable detection robot, including: a first main body 1, a second main body 2, and a rotatable mechanism 3.

In this embodiment, the first main body 1 and the second main body 2 are arranged along a radial direction of a cable 15, and the first main body 1 and the second main body 2 are connected through the rotatable mechanism 3.

In an optional implementation, the first main body 1 is arranged at a front end and the second main body 2 is arranged at a rear end along the radial direction of the cable 15.

In this embodiment, the first main body 1 and the second main body 2 each include a support 29, and a driving apparatus 19, a holding apparatus 27, a multifunctional detection frame 4, and an obstacle surmounting assisting camera apparatus 9 arranged on the support 29.

In this embodiment, the driving apparatus 19 is arranged at a bottom end of the first main body 1 and a bottom end of the second main body 2, and includes a first wheel 16 and a driving motor 30, where the first wheel 16 is connected to the driving motor 30.

In an optional implementation, the first wheel 16 is respectively arranged on front and rear ends along the radial direction of the cable 15.

In an optional implementation, a surface of the first wheel 16 is set to a concave surface.

In an optional implementation, the first wheel 16 and the driving motor 30 are in belt transmission. It may be understood that, another transmission manner may alternatively be used.

In this embodiment, the second main body 2 further includes a controller 17; and the controller 17 is electrically connected to the driving motor 30, to drive the first wheel 16 to move along the cable 15 through the driving motor 30.

In this embodiment, the holding apparatus 27 is symmetrically arranged on two sides of the support 29; the holding apparatus 27 includes a first servo motor 5, a first supporting rod 7, a second supporting rod 8, an adjustable bracket 13, and a supporting wheel group 28; the first servo motor 5, the first supporting rod 7, the second supporting rod 8, the adjustable bracket 13, and the supporting wheel group 28 are symmetrically arranged on two sides of the first main body 1 and the second main body 2; and two first servo motors 5 are used, two first supporting rods 7 are used, two second supporting rods 8 are used, four adjustable brackets 13 are used, and four supporting wheel groups 28 are used.

The first servo motor 5 is electrically connected to the controller 17, and the first servo motor 5 is connected to the first supporting rod 7; and the first supporting rod 7 is connected to the second supporting rod 8, the adjustable bracket 13 and the supporting wheel group 28 are symmetrically arranged on two sides of the first supporting rod 7 and the second supporting rod 8, and the adjustable bracket 13 is connected to the supporting wheel group 28.

In an optional implementation, a motor shaft of the first servo motor 5 is fixedly connected to the first supporting rod 7.

Figure 3:
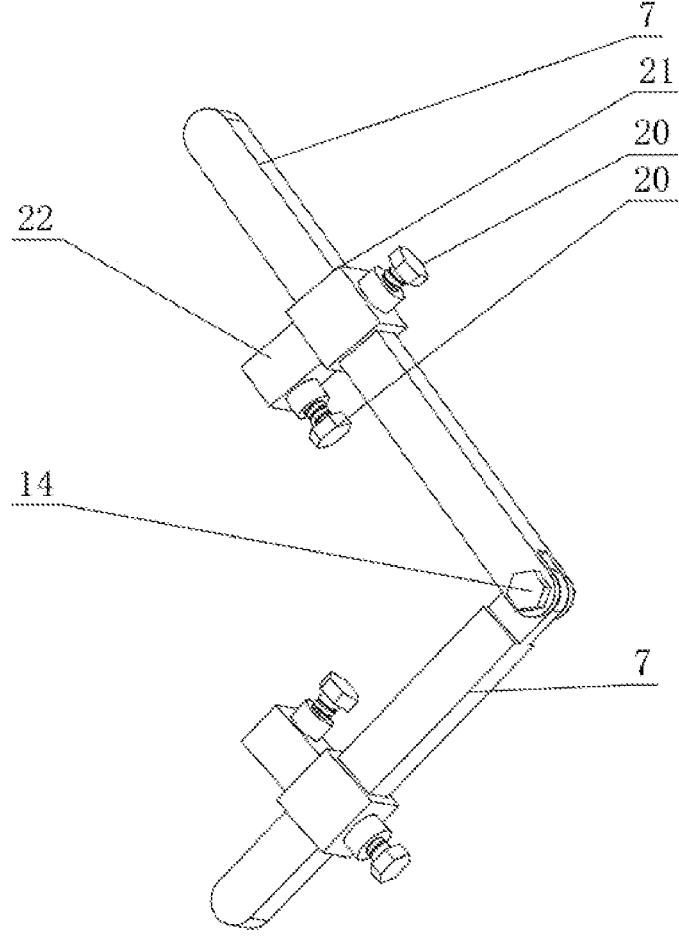
FIG. 3 is a partial cross-sectional view of a first supporting rod according to Embodiment one of the present invention.

In an optional implementation, a rotation joint 14 configured to adjust an angle is arranged at a junction of the first supporting rod 7 and the second supporting rod 8, as shown in FIG. 3.

Furthermore, the rotation joint 14 connects the first supporting rod 7 and the second supporting rod 8 in a bolted connection manner, to adjust a rotation angle between the first supporting rod 7 and the second supporting rod 8.

In an optional implementation, distances between the first supporting rod 7 as well as the second supporting rod 8 and the cable are adjusted by adjusting the angle between the first supporting rod 7 and the second supporting rod 8, to adapt to cables having different diameters.

Figure 4:
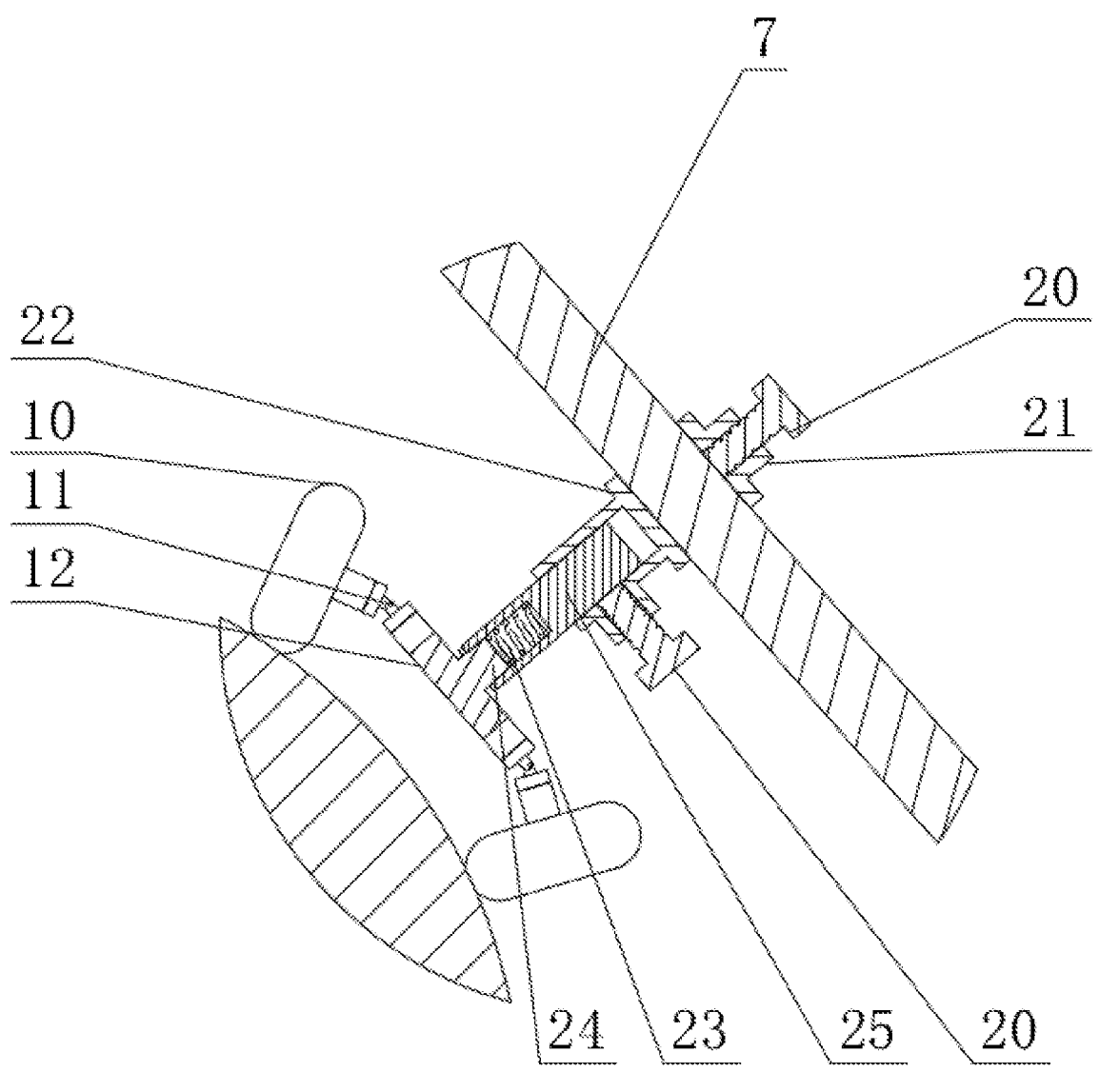
FIG. 4 is a structural diagram of an adjustable bracket according to Embodiment one of the present invention.

In this embodiment, the adjustable bracket 13 includes a first sleeve 21, a second sleeve 22, a telescopic rod 25, and an elastic member 23, as shown in FIG. 4; and the adjustable bracket 13 is fixed to the first supporting rod 7 and the second supporting rod 8 through the first sleeve 21, the first sleeve 21 is connected to the second sleeve 22, the telescopic rod 25 is arranged in the second sleeve 22, the elastic member 23 is arranged in the telescopic rod 25, one end of the elastic member 23 is fixed to the telescopic rod 25, and an other end is fixed to the supporting wheel group 28.

In an optional implementation, the telescopic rod 25 is provided with an inner cavity, and the elastic member 23 is arranged in the inner cavity.

In an optional implementation, the elastic member 23 is welded to the telescopic rod 25, and a diameter of the elastic member 23 is slightly less than a diameter of the inner cavity of the telescopic rod 25, so that the inner cavity is used to limit the elastic member 23, to implement unidirectional stretching and contraction of the elastic member 23.

In an optional implementation, a first sleeve thread is provided on an inner wall of the first sleeve 21, a bolt 20 is connected to the first sleeve thread, and the adjustable bracket 13 is fixed to the first supporting rod 7 by squeezing the first supporting rod 7 after the bolt 20 is tightened.

In an optional implementation, a second sleeve thread is provided on an inner wall of the second sleeve 22, a bolt 20 is connected to the second sleeve thread, and the telescopic rod 25 is fixed to the adjustable bracket 13 by squeezing the telescopic rod 25 after the bolt 20 is tightened.

In an optional implementation, a rubber pad is arranged at a tail end of the telescopic rod 25, and collision between the adjustable bracket 13 and the supporting wheel group 28 is avoided by fixing the rubber pad.

In an optional implementation, the elastic member 23 is a spring.

Figure 5:
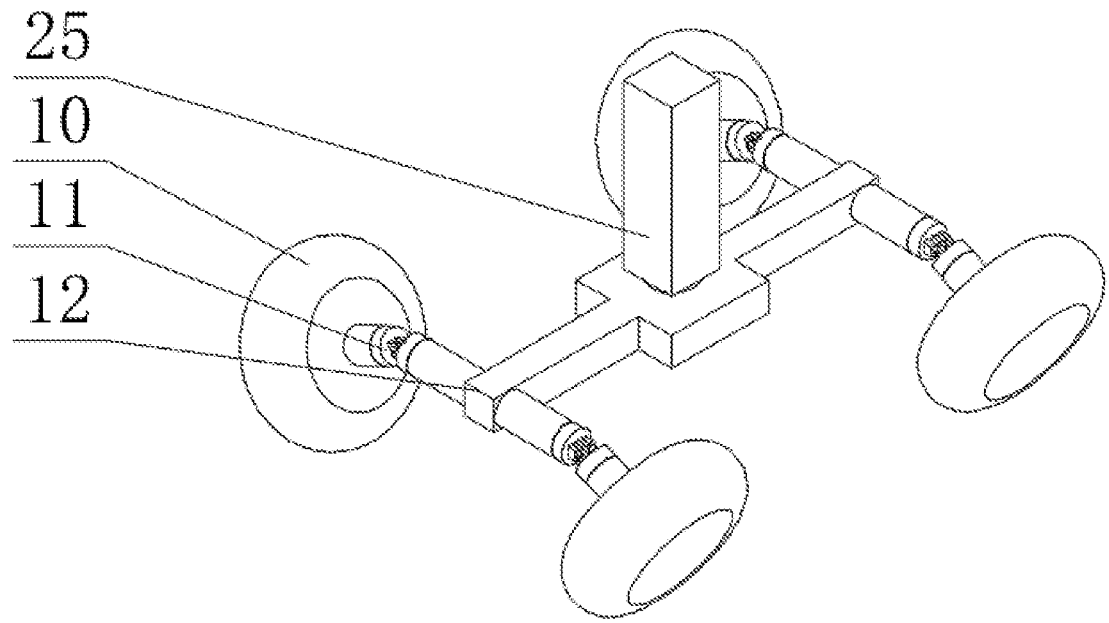
FIG. 5 is a structural diagram of a supporting wheel group according to Embodiment one of the present invention.

In this embodiment, as shown in FIG. 5, the supporting wheel group 28 includes a chassis 12, and joints 11 and second wheels 10 arranged on the chassis 12; and the chassis 12 is connected to the elastic member 23, and the second wheels 10 are connected at two ends of the chassis 12 through the joints 11.

In an optional implementation, the joint 11 is configured to adjust an angle between the second wheel 10 and a surface of the cable 15.

Furthermore, the joint 11 is hinged to the second wheel 10, which helps adjust the angle between the second wheel 10 and the surface of the cable 15 to adapt to different cable diameters.

In an optional implementation, the chassis 12 is I-shaped, a middle portion of the chassis 12 is a protruding column 24, and the column 24 is welded to the elastic member 23.

Furthermore, a diameter of the column 24 is the same as the diameter of the inner cavity of the telescopic rod 25, the column 24 is inserted into the inner cavity of the telescopic rod 25, and a specific gap is kept between the chassis 12 and the telescopic rod 25.

In an optional implementation, a center distance of the second wheel 10 is equal to or slightly less than a center distance of the first wheel 16.

In this embodiment, the rotatable mechanism 3 includes a supporting bracket 26 and a second servo motor 6; and the second servo motor 6 is arranged on both the first main body 1 and the second main body 2, and two ends of the supporting bracket 26 are respectively connected to shafts of the second servo motors 6 of the first main body 1 and the second main body 2.

In an optional implementation, the second servo motor 6 is a high-power servo motor.

In an optional implementation, the second servo motor 6 is connected to the controller 17, so that movement of the first main body 1 or the second main body 2 is driven by controlling the second servo motor 6, to adjust relative positions of the first main body 1 and the second main body 2.

In this embodiment, the angle between the first supporting rod 7 and the second supporting rod 8 matches a diameter of the cable 15, the angle between the first supporting rod 7 and the second supporting rod 8 is adjusted according to the diameter of the cable 15 in advance, the cable detection robot is placed on the cable 15 by adjusting the height of the adjustable bracket 13, and the second wheels 10 of the supporting wheel group 28 are caused to be perpendicular to the surface of the cable 15 by adjusting the relative positions of the supporting wheel group 28 and the surface of the cable 15.

In this embodiment, the controller 17 is connected to the driving motor 30, the first servo motor 5, and the second servo motor 6; and during obstacle surmounting, the entire holding apparatus holds or is separated from cables having different diameters through rotation of the first servo motor 5, and obstacle surmounting is implemented by adjusting the relative positions of the first main body 1 and the second main body 2 through the second servo motor 6.

In this embodiment, the multifunctional detection frame 4 is arranged at an end of the first main body 1 and an end of the second main body 2.

Furthermore, the multifunctional detection frame 4 is arranged at an end of the first main body 1 that is away from the second main body 2 and an end of the second main body 2 that is away from the first main body 1.

In an optional implementation, the multifunctional detection frame 4 may carry a camera apparatus 18 and another detection device.

In this embodiment, the obstacle surmounting assisting camera apparatus 9 is respectively arranged on the first main body 1 and the second main body 2, and the obstacle surmounting assisting camera apparatus 9 is configured to monitor an obstacle surmounting process.

In an optional implementation, the obstacle surmounting assisting camera apparatuses 9 are mounted opposite to each other, to observe the relative positions of the first main body 1 and the second main body 2 and an obstacle surmounting situation.

In more embodiments, an obstacle surmounting working method of the cable detection robot includes:

before working, adjusting the angle between the first supporting rod and the second supporting rod according to a diameter of a cable, placing the cable detection robot on the cable by adjusting the height of the adjustable bracket, and causing the second wheels of the supporting wheel group to be perpendicular to a surface of the cable by adjusting relative positions of the supporting wheel group and the surface of the cable, to facilitate walking;

after the cable detection robot approaches an obstacle, releasing the holding apparatus of the first main body, namely, separating the holding apparatus from the cable through rotation of the first servo motor, where in this case, the second servo motor of the first main body rotates to drive the first main body to be separated from the cable, and the second main body is used as a fulcrum to drive the second main body to move forward along a radial direction of the cable through the driving apparatus of the second main body;

after the first main body surmounts the obstacle, rotating by the second servo motor of the first main body to drive the first main body to be placed on the surface of the cable, controlling the holding apparatus of the first main body to hold the cable, and controlling the holding apparatus of the second main body to release the cable, to cause the first main body to hold the cable again after surmounting the obstacle and separate the second main body from the cable, where in this case, the second servo motor of the second main body rotates to drive the second main body to be separated from the cable, and the first main body is used as a fulcrum to drive the first main body to move forward along the radial direction of the cable through the driving apparatus of the first main body; and after the second main body surmounts the obstacle, rotating by the second servo motor of the second main body to drive the second main body to be placed on the surface of the cable, and controlling the holding apparatus of the second main body to hold the cable, to implement obstacle surmounting.

The specific implementations of the present invention are described above with reference to the accompanying drawings, but are not intended to limit the protection scope of the present invention. A person skilled in the art should understand that various modifications or deformations may be made without creative efforts based on the technical solutions of the present invention, and such modifications or deformations shall fall within the protection scope of the present invention.

The invention claimed is:

1. A cable detection robot, comprising: a first main body, a second main body, and a rotatable mechanism connecting the first main body and the second main body, wherein the first main body and the second main body each comprise a support, and a driving apparatus and a holding apparatus arranged on the support;

the driving apparatus comprises a first wheel and a driving motor, to drive the first wheel to move along a cable through the driving motor;

the holding apparatus is symmetrically arranged on two sides of the support, each side comprises a first servo motor, a first supporting rod, and a second supporting rod that are connected sequentially, an adjustable bracket is respectively arranged on the first supporting rod and the second supporting rod, and the adjustable bracket is connected to a supporting wheel group; a rotation joint configured to adjust the angle is arranged at a junction of the first supporting rod and the second supporting rod; the rotation joint connects the first supporting rod and the second supporting rod in a bolted connection manner, to adjust the rotation angle between the first supporting rod and the second supporting rod;

an angle between the first supporting rod and the second supporting rod matches a diameter of the cable, the supporting wheel group is perpendicular to a surface of the cable by adjusting a height of the adjustable bracket and adjusting relative positions of the supporting wheel group and the surface of the cable, the holding apparatus holds or is separated from the cable through rotation of the first servo motor, and relative positions of the first main body and the second main body are adjusted through the rotatable mechanism to implement obstacle surmounting;

the adjustable bracket comprises a first sleeve, a second sleeve, an elastic member, and a telescopic rod, the adjustable bracket is fixed to the first supporting rod and the second supporting rod through the first sleeve, the first sleeve is connected to the second sleeve, the telescopic rod is arranged in the second sleeve, and the telescopic rod is connected to the supporting wheel group through the elastic member; and the supporting wheel group comprises a chassis, and joints and second wheels arranged on the chassis; and the chassis is connected to the adjustable bracket, and the second wheels are connected at two ends of the chassis through the joints.

2. The cable detection robot according to claim 1, wherein the telescopic rod is provided with an inner cavity, the elastic member is arranged in the inner cavity, one end of the elastic member is fixed to the telescopic rod, and an other end is fixed to the supporting wheel group; or a first sleeve thread is provided on an inner wall of the first sleeve, a bolt is connected to the first sleeve thread, and the adjustable bracket is fixed to the first supporting rod by squeezing the first supporting rod after the bolt is tightened; or a second sleeve thread is provided on an inner wall of the second sleeve, a bolt is connected to the second sleeve thread, and the telescopic rod is fixed to the adjustable bracket by squeezing the telescopic rod after the bolt is tightened.

3. The cable detection robot according to claim 1, wherein the chassis uses an I-shaped structure, a middle portion of the chassis is a protruding column, and the column is connected to the telescopic rod through the elastic member.

4. The cable detection robot according to claim 1, wherein the rotatable mechanism comprises a supporting bracket and a second servo motor; and the second servo motor is arranged on both the first main body and the second main body, and two ends of the supporting bracket are respectively connected to shafts of the second servo motors of the first main body and the second main body, to adjust the relative positions of the first main body and the second main body through the second servo motor; or a controller is further arranged on the second main body, and the controller is connected to the driving motor, the first servo motor, and the second servo motor.

5. The cable detection robot according to claim 1, wherein the cable detection robot further comprises a multifunctional detection frame, and the multifunctional detection frame is arranged at an end of the first main body that is away from the second main body and an end of the second main body that is away from the first main body; or the cable detection robot further comprises an obstacle surmounting assisting camera apparatus, the obstacle surmounting assisting camera apparatus is respectively arranged on the first main body and the second main body, and the obstacle surmounting assisting camera apparatuses are mounted opposite to each other, to observe the relative positions of the first main body and the second main body and an obstacle surmounting situation.

6. A working method of the cable detection robot according to claim 1, comprising:

adjusting the angle between the first supporting rod and the second supporting rod according to the diameter of the cable, placing the cable detection robot on the cable by adjusting the height of the adjustable bracket, and causing the second wheels of the supporting wheel group to be perpendicular to the surface of the cable by adjusting relative positions of the supporting wheel group and the surface of the cable;

during obstacle surmounting, releasing the holding apparatus of the first main body, namely, separating the holding apparatus from the cable through rotation of the first servo motor, wherein in this case, the second servo motor of the first main body rotates to drive the first main body to be separated from the cable, and the second main body is used as a fulcrum to drive the second main body to move forward along a radial direction of the cable through the driving apparatus of the second main body;

after the first main body surmounts an obstacle, rotating by the second servo motor of the first main body to drive the first main body to be placed on the surface of the cable, controlling the holding apparatus of the first main body to hold the cable, and controlling the holding apparatus of the second main body to release the cable, wherein in this case, the second servo motor of the second main body rotates to drive the second main body to be separated from the cable, and the first main body is used as a fulcrum to drive the first main body to move forward along the radial direction of the cable through the driving apparatus of the first main body; and after the second main body surmounts the obstacle, rotating by the second servo motor of the second main body to drive the second main body to be placed on the surface of the cable, and controlling the holding appa-
ratus of the second main body to hold the cable, to
implement obstacle surmounting.

7. A working method of the cable detection robot accord-
ing to claim 2, comprising:

adjusting the angle between the first supporting rod and
the second supporting rod according to the diameter of
the cable, placing the cable detection robot on the cable
by adjusting the height of the adjustable bracket, and
causing the second wheels of the supporting wheel
group to be perpendicular to the surface of the cable by
adjusting relative positions of the supporting wheel
group and the surface of the cable;

during obstacle surmounting, releasing the holding appa-
ratus of the first main body, namely, separating the
holding apparatus from the cable through rotation of
the first servo motor, wherein in this case, the second
servo motor of the first main body rotates to drive the
first main body to be separated from the cable, and the
second main body is used as a fulcrum to drive the
second main body to move forward along a radial
direction of the cable through the driving apparatus of
the second main body;

after the first main body surmounts an obstacle, rotating
by the second servo motor of the first main body to
drive the first main body to be placed on the surface of
the cable, controlling the holding apparatus of the first
main body to hold the cable, and controlling the hold-
ing apparatus of the second main body to release the
cable, wherein in this case, the second servo motor of
the second main body rotates to drive the second main
body to be separated from the cable, and the first main
body is used as a fulcrum to drive the first main body
to move forward along the radial direction of the cable
through the driving apparatus of the first main body;
and after the second main body surmounts the obstacle, rotat-
ing by the second servo motor of the second main body
to drive the second main body to be placed on the
surface of the cable, and controlling the holding appa-
ratus of the second main body to hold the cable, to
implement obstacle surmounting.

8. A working method of the cable detection robot accord-
ing to claim 3, comprising:

adjusting the angle between the first supporting rod and
the second supporting rod according to the diameter of
the cable, placing the cable detection robot on the cable
by adjusting the height of the adjustable bracket, and
causing the second wheels of the supporting wheel
group to be perpendicular to the surface of the cable by
adjusting relative positions of the supporting wheel
group and the surface of the cable;

during obstacle surmounting, releasing the holding appa-
ratus of the first main body, namely, separating the
holding apparatus from the cable through rotation of
the first servo motor, wherein in this case, the second
servo motor of the first main body rotates to drive the
first main body to be separated from the cable, and the
second main body is used as a fulcrum to drive the
second main body to move forward along a radial
direction of the cable through the driving apparatus of
the second main body;

after the first main body surmounts an obstacle, rotating
by the second servo motor of the first main body to
drive the first main body to be placed on the surface of
the cable, controlling the holding apparatus of the first
main body to hold the cable, and controlling the holding apparatus of the second main body to release the
cable, wherein in this case, the second servo motor of
the second main body rotates to drive the second main
body to be separated from the cable, and the first main
body is used as a fulcrum to drive the first main body
to move forward along the radial direction of the cable
through the driving apparatus of the first main body;
and after the second main body surmounts the obstacle, rotat-
ing by the second servo motor of the second main body
to drive the second main body to be placed on the
surface of the cable, and controlling the holding appa-
ratus of the second main body to hold the cable, to
implement obstacle surmounting.

9. A working method of the cable detection robot accord-
ing to claim 4, comprising:

adjusting the angle between the first supporting rod and
the second supporting rod according to the diameter of
the cable, placing the cable detection robot on the cable
by adjusting the height of the adjustable bracket, and
causing the second wheels of the supporting wheel
group to be perpendicular to the surface of the cable by
adjusting relative positions of the supporting wheel
group and the surface of the cable;

during obstacle surmounting, releasing the holding appa-
ratus of the first main body, namely, separating the
holding apparatus from the cable through rotation of
the first servo motor, wherein in this case, the second
servo motor of the first main body rotates to drive the
first main body to be separated from the cable, and the
second main body is used as a fulcrum to drive the
second main body to move forward along a radial
direction of the cable through the driving apparatus of
the second main body;

after the first main body surmounts an obstacle, rotating
by the second servo motor of the first main body to
drive the first main body to be placed on the surface of
the cable, controlling the holding apparatus of the first
main body to hold the cable, and controlling the hold-
ing apparatus of the second main body to release the
cable, wherein in this case, the second servo motor of
the second main body rotates to drive the second main
body to be separated from the cable, and the first main
body is used as a fulcrum to drive the first main body
to move forward along the radial direction of the cable
through the driving apparatus of the first main body;
and after the second main body surmounts the obstacle, rotat-
ing by the second servo motor of the second main body
to drive the second main body to be placed on the
surface of the cable, and controlling the holding appa-
ratus of the second main body to hold the cable, to
implement obstacle surmounting.

10. A working method of the cable detection robot accord-
ing to claim 5, comprising:

adjusting the angle between the first supporting rod and
the second supporting rod according to the diameter of
the cable, placing the cable detection robot on the cable
by adjusting the height of the adjustable bracket, and
causing the second wheels of the supporting wheel
group to be perpendicular to the surface of the cable by
adjusting relative positions of the supporting wheel
group and the surface of the cable;

during obstacle surmounting, releasing the holding appa-
ratus of the first main body, namely, separating the
holding apparatus from the cable through rotation of
the first servo motor, wherein in this case, the second servo motor of the first main body rotates to drive the first main body to be separated from the cable, and the second main body is used as a fulcrum to drive the second main body to move forward along a radial direction of the cable through the driving apparatus of the second main body;

after the first main body surmounts an obstacle, rotating by the second servo motor of the first main body to drive the first main body to be placed on the surface of the cable, controlling the holding apparatus of the first main body to hold the cable, and controlling the holding apparatus of the second main body to release the cable, wherein in this case, the second servo motor of the second main body rotates to drive the second main body to be separated from the cable, and the first main body is used as a fulcrum to drive the first main body to move forward along the radial direction of the cable through the driving apparatus of the first main body; and after the second main body surmounts the obstacle, rotating by the second servo motor of the second main body to drive the second main body to be placed on the surface of the cable, and controlling the holding apparatus of the second main body to hold the cable, to implement obstacle surmounting.

\* \* \* \* \*